Figure 3:
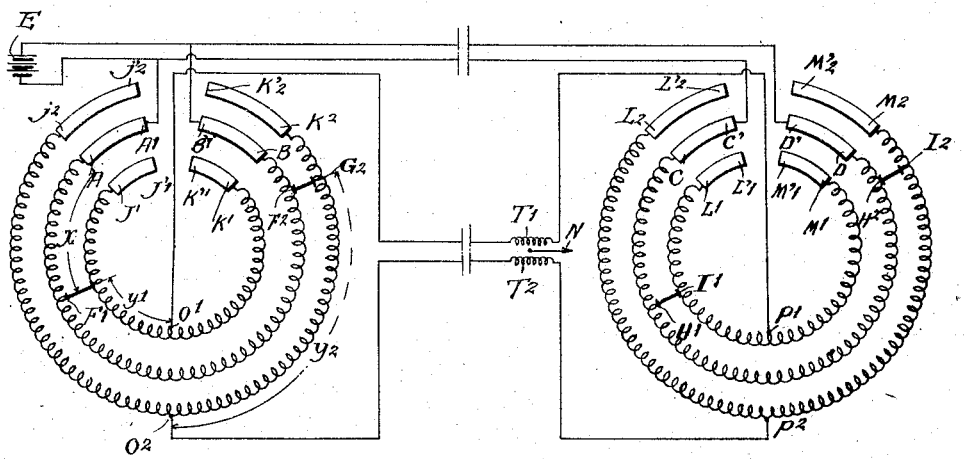

April 26, 1927.
E. SCHNEIDER
1,626,560
TRANSMITTING APPARATUS UTILIZING THE PRINCIPLE
OF THE WHEATSTONE BRIDGE
Filed Jan. 4, 1922
3 Sheets-Sheet 1
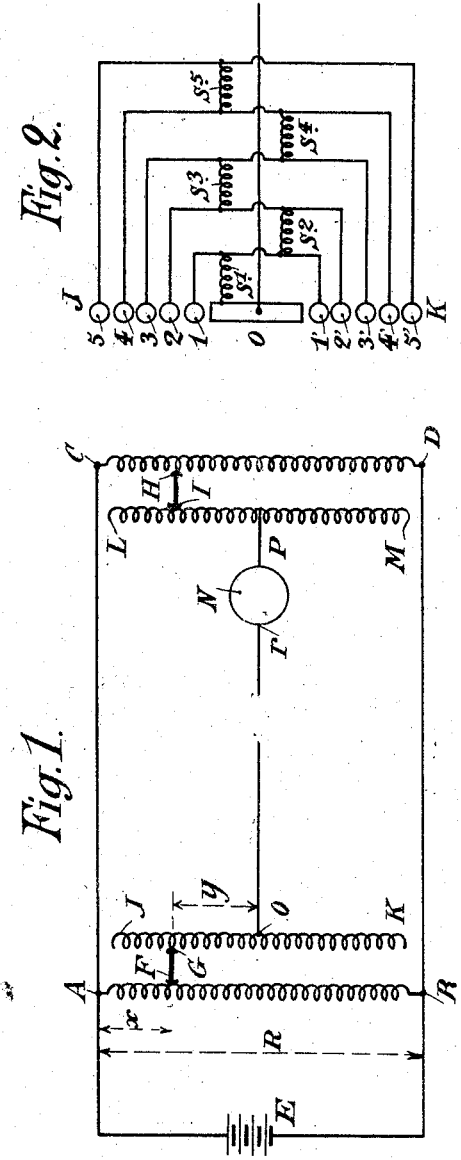

April 26, 1927.

E. SCHNEIDER 1,626,560

TRANSMITTING APPARATUS UTILIZING THE PRINCIPLE
OF THE WHEATSTONE BRIDGE

Filed Jan. 4, 1922    3 Sheets-Sheet 2

Inventor:
Eugene Schneider,
By Mauro, Cameron, Lewis & Kerkam

April 26, 1927.

E. SCHNEIDER 1,626,560

TRANSMITTING APPARATUS UTILIZING THE PRINCIPLE
OF THE WHEATSTONE BRIDGE

Filed Jan. 4, 1922  3 Sheets-Sheet 3

Inventor
Eugene Schneider
By Mauro, Cameron, Lewis & Kerkam

Patented Apr. 26, 1927.

1,626,560

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT STOCK COMPANY OF FRANCE.

TRANSMITTING APPARATUS UTILIZING THE PRINCIPLE OF THE WHEATSTONE BRIDGE.

Application filed January 4, 1922, Serial No. 526,984, and in France June 15, 1921.

It is known that in all the transmissions utilizing the classical arrangement of the Wheatstone bridge the carrying out of an order which is transmitted is effected by bringing the needle of a voltmeter back to zero.

When it is desired to have a high degree of precision, it is necessary to bring the degree of sensitivity to a maximum by suppressing the additional resistance which is usually introduced in series with the movable coil of all the voltmeters. It follows that the resistance consisting of the circuit which comprises the coil of the voltmeter and the arms of the bridge is subjected to important variations according to the position of movable contacts along two rheostats which are used as potentiometers, and that therefore for one and the same displacement between the positions of the pointers of the transmitting and receiving device, the deviations of the needle of the voltmeter may be very different from each other. This is a serious drawback because the deviations of the needle, under these conditions, do not give the operator of the receiving station an idea of the angular distance which he has to correct, and this idea is indispensable in order for him to determine the speed at which he should move the adjustable parts in order to properly return the needle to zero position.

The main object of the invention is to do away with the above drawback, and to maintain the sensitivity constant in such a manner as to keep proportionality between the deviations of the needle of the voltmeter and the displacements to be corrected, bringing the degree of precision to a maximum, the means which are used consisting in automatically introducing in the circuit of the voltmeter compensating resistances, the value of which is adjusted according to the position of the movable contacts on the rheostats which are used as potentiometers.

These movable contacts are preferably adapted to indicate to the operators at each station the orders which are being transmitted and may be provided, for example, with suitable graduated scales or dials for this purpose.

The present invention allows, in addition, of ensuring a continuity of indications when applied to a bridge with two contacts with a voltmeter having two coils such as described in the U. S. Patent No. 1,409,586 of March 14, 1922.

The diagrammatical Figure 1 shows how the invention may be carried out in the case when use is made of a transmission with Wheatstone bridge of the usual type, and comprising one receiver only.

The diagrammatical Figure 2 shows how the compensating resistances may be constructed.

The diagrammatical Figure 3 shows how the invention may be applied in the case when use is made of the bridge with two contacts with a voltmeter having two coils such as described in the patent referred to above.

The diagrammatical Figure 4 shows how the compensating resistances may be determined in the case of Figure 3, and illustrates the value of the current flowing through the two voltmeter coils.

Figure 5:
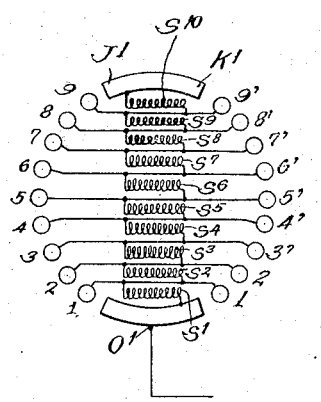

The diagrammatical Figure 5 shows how the compensating resistances may be constructed in the case of Figure 3.

Figure 6:
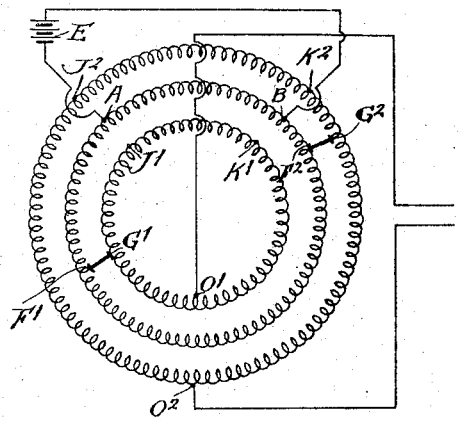

Figure 6 shows a modification in the arrangement illustrated in Figure 3.

Figure 7:
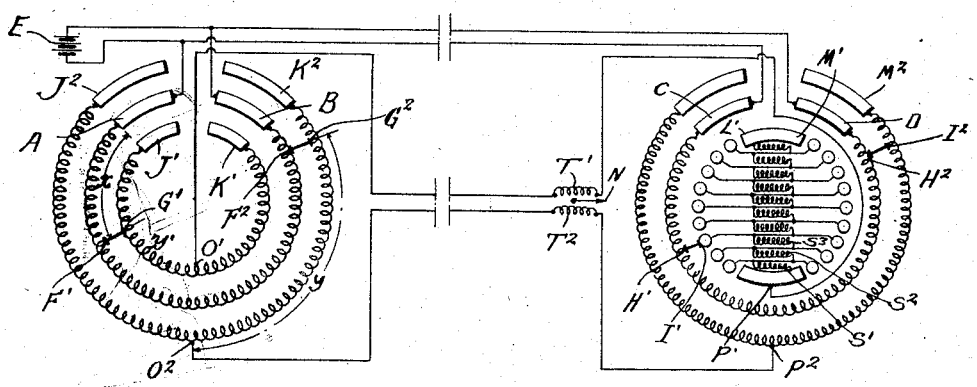

Figure 7 diagrammatically illustrates another embodiment of the arrangement shown in Figure 3.

Figure 8:
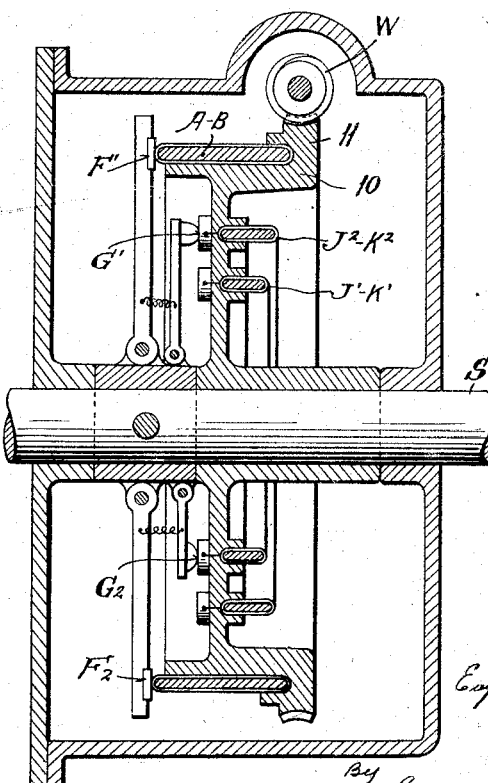

Figure 8 is a longitudinal sectional view of the resistances and contact points diagrammatically shown in the left-hand half of Figures 3 and 7.

In the diagrammatical Figure 1, A—B and C—D illustrate the rheostats which are used as potentiometers respectively at the transmitting and receiving station and which are fed by the battery E.

F—G and H—I are two movable contacts rubbing on the one side on A—B and C—D and on the other side on the compensating resistances J—K and L—M.

N is a controlling voltmeter situated at the receiving station and connected at O and P, by means of a suitable bridgewire, at the middle part of the compensating resistances J—K and L—M.

The reception of the orders transmitted by the displacement of F—G is effected exactly as in the case of an ordinary bridge by displacing H—I in such a manner as to bring the needle of N back to zero.

Let R be the resistance of each of the compensating potentiometrical rheostats A—B and C—D, $r$ the resistance of the coil of the voltmeter, $x$ the partial resistance A—F and $y$ the partial resistance O—G.

If we suppose that H—I after having been brought in the position for which the needle N is at the zero, has been displaced through a very small quantity $d$ introducing an electro-motive force $e$ in the complex circuit which the voltmeter feeds it is possible to admit without any appreciable error that we get CH=$x$ and PI=OG=$y$.

The intensity $i$ of the current producing a displacement of the needle N would be given under these conditions, by the equation:

$$i = \frac{e}{r+2y+\frac{2x \cdot 2 \cdot (r-x)}{2x+2(R-x)}} = \frac{e}{r+2y+\frac{2x \cdot (R-x)}{R}} \quad (1)$$

The electro-motive force $e$, put in play, acts in a circuit which comprises the resistance $r$ of the voltmeter plus two times the resistance $y$, and which is closed for the one part, by HCAF and for the other part, by HDBG. The resistance of HCAF being $2x$, and the resistance of HDBG being $2(R-x)$, the combined resistance of these two branches is $$\frac{2x \cdot 2(R-x)}{2x+2(R-x)}$$

and consequently the current $i$ which passes through the voltmeter is equal to the value set forth in the equation above.

In the case which has been considered, in order that the constant of the sensitivity shall be obtained, it is necessary that the values of $y$ shall be determined in function of $x$ in such a manner that it shall remain constant whatever $x$ may be. In particular, for $$x = \frac{R}{2}$$

we get $y=0$ and $$i = \frac{e}{r+\frac{R}{2}}.$$

By substituting this value of $i$ in (1) we get $$\frac{e}{r+\frac{R}{2}} = \frac{e}{r+2y+\frac{2x \cdot (R-x)}{R}} \quad (3)$$

that is:

$$r+2y+2x \cdot \frac{R-x}{R} = r+\frac{R}{2} \quad (4)$$

and $$y = \frac{R}{4} - x\frac{R-x}{R} \quad (5)$$

This equation gives the law according to which the compensating resistances should be determined in order that a strictly constant sensitivity shall be obtained.

Figure 2 shows how the compensating resistance J—O—K (see Figure 1) may be constructed by utilizing a rheostat with contacts. With this arrangement the sensitivity is no longer strictly constant, but it is easily possible to limit the said variations at an acceptable rate (for example 10%) by adopting a sufficiently large number of contacts. The successive resistances $y^1$, $y^2$, $y^3$, $y^4$, $y^5$, will be determined by applying the formula (5) for the values of $x$ corresponding to the centres of the contacts 1, 2, 3, 4, 5. It will be noticed that as the function $y$ has an axis of symmetry for $$x = \frac{R}{2}$$

it is possible to interconnect two by two the contacts 1—1', 2—2', 3—3', 4—4', 5—5' situated at equal distance from the centre O which permits, as shown in Figure 2 of simplifying the construction by reducing by half the number of elementary resistances $S^1$, $S^2$, $S^3$, $S^4$, $S^5$ inserted between the contacts.

It will be also noticed that the central contact may be replaced by a sector, because $y$ varies very slowly when $x$ has values in the neighbourhood of $\frac{R}{2}$.

In the case of Figure 3, A—B and C—D show the rheostats which are used as potentiometers at the transmitting and receiving stations and which are fed by the battery E.

$F^1$—$G^1$ and $H^1$—$I^1$ show a first series of two movable contacts rubbing on one side on A—B and C—D, and on the other side on the compensating resistances $J^1$—$K^1$ and $L^1$—$M^1$.

$F^2$—$G^2$ and $H^2$—$I^2$ are a second series of two movable contacts which always remain diametrically opposite to the first contacts.

In order to facilitate the description, it will be admitted by way of example that the potentiometers and compensating resistances have a development of 270° and that they are prolonged by sectors such as A—A' and B—B' leaving between them a free interval of 10°.

The carrying out of orders transmitted by a simultaneous displacement of $F^1$—$G^1$ and $F^2$—$G^2$ will be effected by simultaneously displacing $H^1$—$I^1$ and $H^2$—$I^2$ in such a manner as to bring back to zero the needle of the voltmeter N which comprises two coils $T^1$ and $T^2$.

The compensating resistances $y^1$ and $y^2$ must in this case be determined in such a manner that for a very small angular displacement $d$ between the positions of the pointers at the transmitting and receiving stations, the sum of the intensities $i^1$ and $i^2$ which pass respectively through the frames $T^1$ and $T^2$ shall remain practically constant whatever the value of $x$ may be.

For this purpose it is possible to admit for instance that the resistances $y^1$ and $y^2$ will be chosen in such a manner that $i^1$ and $i^2$ follow the laws of variations which are illustrated in function of the angular displacement of $F^1$—$G^1$ by the diagrams of Figure 4, in which the dotted lines correspond to $i^1$, the broken lines to $i^2$ and the dot and dash lines to the sum $i^1+i^2$. The said figure shows that as long as $F^1$—$G^1$ is situated between $B'$ and $A'$ or between $A'$ and $A$, the frame $T^2$ alone is in action, the sensitivity having then a value which is proportional to Z (maximum of $i^2$). From 45° to 135°, the action of $T^2$ goes decreasing while that of $T^1$ goes increasing, and the sensitivity is equal to Zx1, 1. From 35° to 180°, the frame $T^1$ remains alone in service and the sensitivity is equal to Z. Owing to symmetry the same cycle is obviously reproduced from 180°, the action of $T^1$ being replaced by that of $T^2$ and vice versa.

The values of $y$ corresponding to a predetermined value of $i^1$ or $i^2$ will be determined by points from the equation (1).

Any other law of variation may of course be chosen for $i^1$ and $i^2$, on the sole condition that the sum of $i^1$ and $i^2$ shall remain practically constant.

The arrangement illustrated in Figure 3 allows not only of maintaining the sensitivity constant during the normal operation of the transmission, but also of obtaining two special advantages in the case of a temporary stopping of the operation of the receiver. In order to emphasize the importance of these advantages we shall examine first of all what are the difficulties which may arise in the case when the compensating resistances would be replaced by rings of terminals and when the sectors A—A', B—B', C—C', D—D' would be suppressed which would bring the arrangement to the one described in the U. S. Patent 1,409,586 dated March 14, 1922.

If we suppose the receiver to be temporarily kept in a position such that $H'$ shall be on C, it will be seen first of all that if $F'$ has been displaced upwards through 90° in such a manner as to be brought on B, the current will be suddenly reversed in the frame $T'$. Then it will be seen that by supposing the receiver to be kept fixed in a position such that $H'$ shall be in the cutting-off zone in the immediate neighbourhood of C, if $F'$ has been displaced downwards, the current in $T^2$ would be also cut off as soon as $F^2$ has arrived on B, that is, as soon as $F'$ will have been displaced through 90°. Therefore, there would be a danger in the case when the displacement between the transmitting and the receiving stations would accidentally exceed 90°, that no more indications would be received at the receiving station or that the indications which would be received would be erroneous for the placing of the two stations in agreement with each other. Moreover, if V is the feeding voltage, in the case when $H'$ would be maintained on C, and $F'$ on B, the frame $T'$ would be traversed by a current, the intensity of which would reach $\frac{V}{r}$; therefore it could become overheated, and in any case this would produce, at the moment of closing the current, a violent shock of the needle of the voltmeter against its stops, which shock would be capable, if repeated, of damaging the apparatus.

Let us now consider the case of Figure 3. It will be immediately seen that the cutting-off position (corresponding to the displacement between $A'$ and $B'$) being reduced to 10°, a displacement of at least 170° would be necessary in order that the current shall be simultaneously cut-off in the two frames. Moreover, it will be seen that if $F'$ is brought on $B'$ when $H'$ is on C or on $C'$, then the current which traverses the frame $T'$ will be equal to $$\frac{V}{r+2Ym}$$

(in which formula $Ym$ is the maximum value of the compensating resistance) and that it will, therefore, be always possible, by giving to $Ym$ a suitable value, to reduce at will at the same time the shock of the needle against its stops and the danger of overheating the frame.

Lastly it will be seen that if $F'$ is brought on $B'$ when $H'$ is on $C'$ and the current in the frame $T'$ (which would have a tendency to reverse the direction of the normal deviation of the voltmeter) remaining equal to $$\frac{V}{r+2Ym}$$

the current in the frame $T^2$ would be equal to $$\frac{Vx10}{270r};$$

since, as it has already been pointed out, the compensating resistance in the neighbourhood of O' may be considered as being negligible and since the rheostats extend over an angular distance of 270°, points C', D' being separated by an angular distance corresponding to 10°.

In order to avoid the reversing of the deviation, it will therefore be sufficient if the following condition is fulfilled:—

$$\frac{V}{r+2Ym} < \sqrt{\frac{Vx10}{270r}}$$

that is if $Ym > rx13\cdot45$.

In Figure 3, it is of course possible to substitute resistances for the sectors which prolong the potentiometrical rheostats and the compensating resistances.

It is also possible to replace each of the systems having two resistances such as J'—O' and O'—K' by a rheostat with contacts such as the one which is illustrated in Figure 5, and which is similar in every respect to that shown in Figure 2.

Figure 6 illustrates a modification of Figure 3 in which the cutting-off zone has been entirely suppressed by replacing the sectors such as A—A' and J—J' by suitable resistances. For simplification purposes, only the transmitting station has been illustrated; it will be noticed that the resistances replacing the sectors retain A to B, J' to K' and $J^2$ to $K^2$. The working of this device is in all points similar to the one of Figure 3, with this peculiarity that there is no longer a cutting off zone and that the reversing of the current in the frames is more progressively effected.

In the arrangement shown in Figure 6, the compensating resistances may be replaced by rheostats with contacts, such as the one illustrated in Figure 5.

Fig. 7 illustrates another embodiment of the present invention wherein the resistance L', P', M', of Fig. 3 has been replaced by the type of resistances shown in Fig. 5. It is to be expressly understood that the resistances shown in Fig. 5 may replace the annular resistance J', O', K', shown in the left-hand half of Figs. 3 and 7, or vice versa.

In the case when several receiving stations have to be operated by means of one transmitting station, it will be advantageous to make use of the distributor described in the U. S. Patent 1,409,586 which allows of alternately and successively connecting each of the receiving stations with the transmitting station.

It is often necessary in the application of distant transmissions to be able to introduce a certain displacement between the pointer of the transmitting station and the pointers of the receiving stations. By way of example, it may be mentioned that when the transmission is applied to the telepointing in direction of artillery guns, it may be necessary to add the corrections of parallax and deflection of the tangent-sight to the angle of sight.

The above arrangements allow of obtaining in a very simple manner the result which is looked after, on the condition that the compensating resistances shall be rendered mechanically integral with the potentiometrical rheostats. Indeed it is then sufficient to displace together at the transmitting and receiving stations, through the desired angle, the potentiometers and the compensating resistances relatively to the movable contacts which remain connected respectively with the telescope (transmitting station) and with the guns (receiving station).

Figure 8 illustrates one manner in which the potentiometer and compensating resistances may be displaced relative to the movable contacts. In the form shown, the potentiometer A B, and the resistances $J^2 K^2$ and $J'_2, K'_2$, are mounted on a common support 10, which in this instance is a flanged drum provided on its periphery with a worm wheel 11 which is engaged by a worm W. The drum 10 is loosely mounted on shaft S. Rigidly secured to said shaft are the contacts F' G' $F^2$ $G^2$. Rotation of worm W results in a displacement of the potentiometer and resistances relative to said contacts.

Having now particularly described and ascertained the nature of my said invention and in what manner the same is to be performed, I declare that what I claim is:—

1. A transmitting system based on the principle of the Wheatstone bridge comprising transmitting and receiving station bridge resistances forming the arms of said bridge, connections between said stations to complete said bridge including a bridge wire having an indicator therein, compensating resistances in said bridge wire, and indicating means at each station including means for varying the relation of the resistances in the bridge arms and for changing the amount of compensating resistance in said bridge wire in accordance therewith to cause the deviations of the indicator to remain proportional to the displacements between the indicating means of the transmitting and receiving stations.

2. A transmission to a distance comprising transmitting and receiving station resistances forming the arms of a Wheatstone bridge, connections between said stations to complete the bridge including a bridge wire having a voltmeter therein, compensating resistances in said bridge wire, and means at each of said stations for simultaneously varying the relation of the resistances in the bridge arms and for changing the amount of compensating resistance in said bridge wire in accordance therewith, each of said compensating resistances including a sector, two series of contacts symmetrically arranged relative to said sector, a plurality of conductors connecting said contacts two by two, and a series of elementary resistances inserted between said conductors, the sum of said elementary resistances corresponding for each contact to the value of the compensating resistance.

3. Apparatus of the class described comprising transmitting and receiving station annular resistances forming the arms of a Wheatstone bridge, a receiving station voltmeter having two coils, connections between said stations to complete the bridge including a pair of bridge wires each having one of said coils therein, compensating resistances in each of said bridge wires, and diametrically disposed movable contacts at said stations for varying the relation of the resistances in the bridge arms and for changing the amount of compensating resistance in each of said bridge wires in accordance therewith to cause the deviations of the voltmeter needle to remain proportional to the displacements between the movable contacts at the transmitting and receiving station and to prevent the reversing of the indications of said needle.

4. Apparatus of the class described comprising annular transmitting and receiving station resistances forming the arms of a Wheatstone bridge, a receiving station voltmeter having two coils, connections between said stations to complete the bridge including a pair of bridge wires each having one of said coils therein, movable bridges at each of said stations carrying diametrically disposed contacts for varying the relation of the resistances in said bridge arms and changing the amount of said compensating resistance, the latter being such that abnormal heating of said coils is prevented, and sector means for prolonging the angular development of said annular resistances for the purpose of increasing the angular displacement through which one movable bridge may be moved relative to the other without simultaneously cutting off the current in said coils.

5. Apparatus of the class described comprising transmitting and receiving station resistances forming the arms of a Wheatstone bridge, a receiving station indicator having two coils, connections between said stations to complete the bridge including a pair of bridge wires each having one of said coils therein, compensating resistances in said bridge wires, and contact means at each station for varying the relation of the resistances in the bridge arms and for changing the amount of compensating resistance in said bridge wires in accordance therewith to cause the deviations of said indicator to remain proportional to the displacement between said contact means, said compensating resistances including one or more sectors, two series of contacts symmetrically arranged relative to one of said sectors, a plurality of conductors connecting said contacts two by two, a single series of elementary resistances inserted between said conductors, the sum of said elementary conductors corresponding, for each contact, to the value of the compensating resistance.

6. Apparatus of the class described comprising transmitting and receiving station resistances forming the arms of a Wheatstone bridge, connections between said stations to complete the bridge including a bridge wire having a voltmeter therein, compensating resistances in said bridge wire and immovably secured to said bridge resistances, means including movable contacts at each station for varying the relation between the resistances in the bridge arms and for changing the amount of compensating resistance in said bridge wire to cause the deviations of said voltmeter to remain proportional to the displacement between said movable contacts, and means for moving said bridge resistances and compensating resistances relative to said movable contacts.

In testimony whereof I have signed this specification.

EUGÈNE SCHNEIDER.